(No Model.)
R. P. PEARSON.
LOOM TEMPLE.
No. 539,188. Patented May 14, 1895.
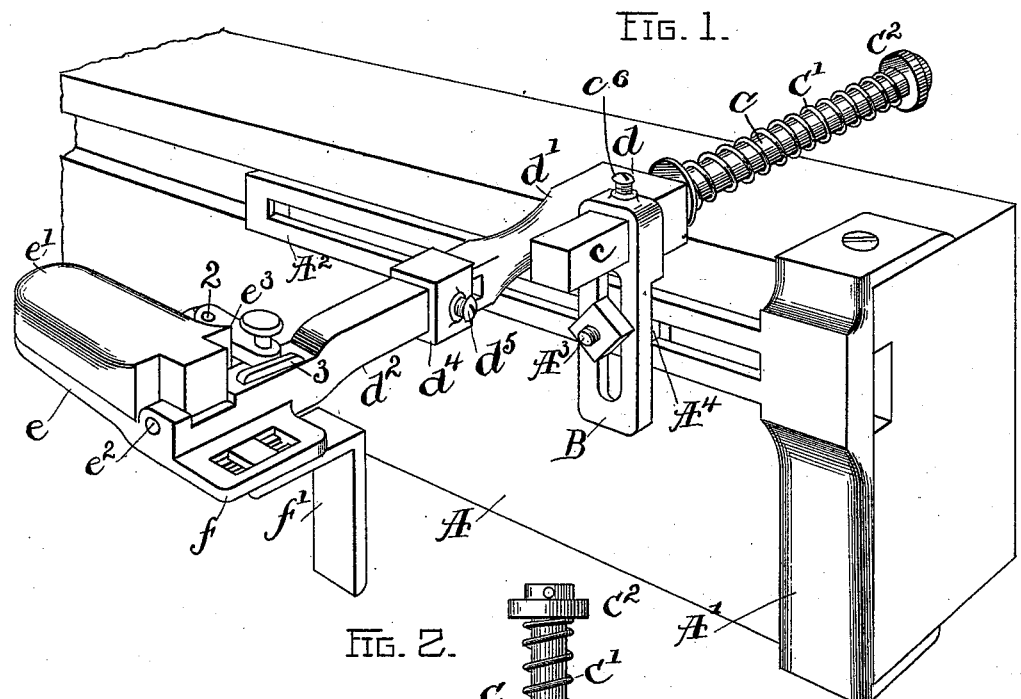
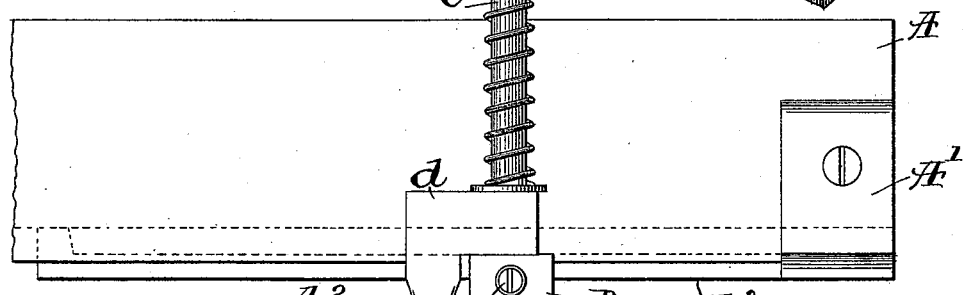
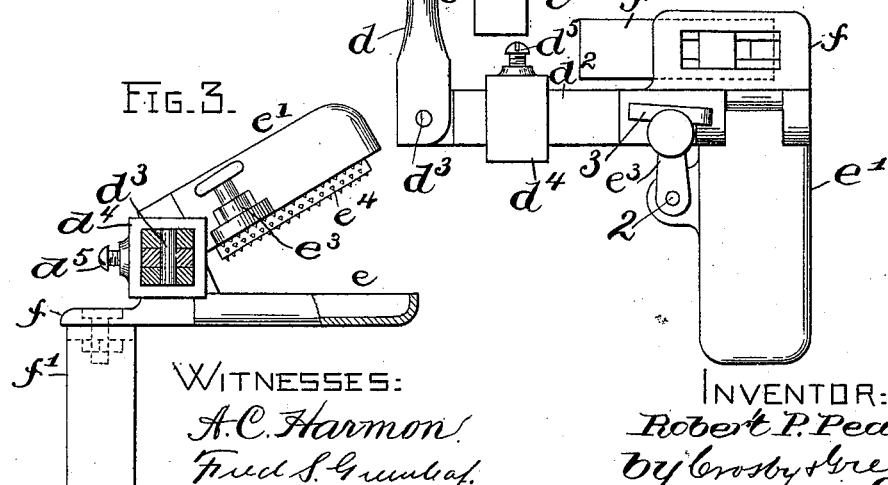
WITNESSES:
A. C. Harmon
Fred S. Greenleaf
INVENTOR:
Robert P. Pearson.
by Crosby & Gregory
Attys.

UNITED STATES PATENT OFFICE.

ROBERT P. PEARSON, OF GLEN RIDDLE, PENNSYLVANIA, ASSIGNOR TO THE DUTCHER TEMPLE COMPANY, OF HOPEDALE, MASSACHUSETTS.

LOOM-TEMPLE.

SPECIFICATION forming part of Letters Patent No. 539,188, dated May 14, 1895.

Application filed October 17, 1893. Serial No. 488,380. (No model.)

*To all whom it may concern:*

Be it known that I, ROBERT P. PEARSON, of Glen Riddle, Delaware county, State of Pennsylvania, have invented an Improvement in Loom-Temples, of which the following description, in connection with the accompanying drawings, is a specification, like letters and numerals on the drawings representing like parts.

In loom temples as now ordinarily constructed, when a mispick has to be taken out of the cloth, the usual sliding temple is pushed back away from the reed, and the slide-bar surrounded by the spring is caught and is supposed to be held during the operation of "picking-out." It is not, however, infrequent that the operator by some accidental movement releases the temple, and it flies forward at the wrong time, to the injury of the cloth, and of the fingers of the operator. To obviate this I have produced a simple form of temple wherein the shank of the temple head is jointed between its ends to permit one part to swing laterally upon the other, and having a foot to slide longitudinally on a stud attached to a suitable stand and surrounded by a spring, a coupling being provided to render the two parts of the shank rigid between the temple head and the foot, so that by slipping the collar along on the shank the joint in the temple shank is broken and the temple head on one part of the shank can be swung laterally upon the other part, thus taking the temple head away from the selvage and leaving the cloth accessible to the operator.

Figure 1, in perspective, represents a loom-temple embodying my invention, together with part of the breast-beam; Fig. 2, a plan view thereof, together with the holding-plate connected to the breast-beam; and Fig. 3, a detail in section through the shank-joint, the cap being shown as lifted and the pod as partially broken out.

In the drawings, A, represents a portion of the usual breast beam; A', a clamp adapted to be secured to the inner side of the breast beam, said clamp having an attached slotted plate or bar $A^2$, the slot of the bar $A^2$ receiving a bolt $A^3$ having preferably a squared shank shown at $A^4$, the bolt also receiving a stand B, said stand being slotted about said bolt to thus provide for vertical and horizontal adjustment of the stand, and consequently of the temple carried by it. The upper end of the stand receives and has secured to it a stud C surrounded by a spring C', which at one end abuts against a suitable nut or collar $C^2$, the opposite end of the spring bearing against the foot $d$ of the two-part temple shank $d'$, $d^2$, the said two parts being united by a suitable hinge or pivot joint at $d^3$, the joint being covered when it is desired to make the shank rigid by means of a coupling $d^4$ secured in place by a screw $d^5$. The forward portion of the jointed shank has fixed to it the pod $e$ of the temple, the cap $e'$ being pivoted to the bar at $e^2$, said cap having connected to it a suitable locking device $e^3$, shown as a dog pivoted at 2, the end of the dog co-operating with a lug or projection 3, carried, as represented, by the shank.

By turning the locking device aside away from the shank, the cap may be raised to uncover the temple roll $e^4$, as in Fig. 3, which may be of any usual or suitable construction and be mounted in a suitable manner.

The shank has at one side of it a plate $f$ to which is connected, preferably in an adjustable manner, a heel-piece $f'$.

The lay strikes the heel-piece at each forward stroke and moves the temple in unison with it for a portion of its stroke, the foot then sliding aside against the spring.

The inner end $c$ of the stud C, as shown in the drawings, is made square to fit a hole in the stand B, said stud being represented as confined in said stand by a suitable screw $c^6$, said screw providing for the adjustment of the temple toward and from the lay.

Having described my invention, what I claim as new, and desire to secure by Letters Patent, is—

The stand having the attached stud, and a spring surrounding said stud, a temple-head, and a temple shank jointed between its ends to permit one part to swing laterally upon the other and having a foot to slide longitudinally on said stud, combined with a coupling to render the two parts of the shank rigid between the temple head and the foot, substantially as described.

In testimony whereof I have signed my name to this specification in the presence of two subscribing witnesses.

ROBERT P. PEARSON.

Witnesses:
JOHN A. WIEDERSHEIM,
FRANK J. DUTCHER.